US011265446B2

(12) United States Patent
Zhu et al.

(10) Patent No.: US 11,265,446 B2
(45) Date of Patent: Mar. 1, 2022

(54) FRAME HANDLING FOR ML-BASED UPSCALING

(71) Applicants: Sony Corporation, Tokyo (JP); Sony Pictures Entertainment Inc., Culver City, CA (US)

(72) Inventors: Miaoqi Zhu, Studio City, CA (US); Yoshikazu Takashima, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/440,808

(22) Filed: Jun. 13, 2019

(65) Prior Publication Data

US 2020/0126183 A1    Apr. 23, 2020

Related U.S. Application Data

(60) Provisional application No. 62/747,453, filed on Oct. 18, 2018.

(51) Int. Cl.
*H04N 1/60* (2006.01)
*G06K 9/46* (2006.01)
(Continued)

(52) U.S. Cl.
CPC ......... *H04N 1/6027* (2013.01); *G06K 9/4652* (2013.01); *G06K 9/6256* (2013.01);
(Continued)

(58) Field of Classification Search
CPC ....... G06T 3/4046; G06T 3/4053; G06T 7/13; G06T 2207/20081; G06N 20/00
See application file for complete search history.

(56) References Cited

U.S. PATENT DOCUMENTS 5,237,624 A    8/1993    Okamoto
8,395,708 B2   3/2013    Lee
(Continued)

FOREIGN PATENT DOCUMENTS

| EP | 1164781 A1 | 12/2001 |
|---|---|---|
| JP | 6349703 B | 7/2018 |
| WO | WO-2017124036 A1 | 7/2017 |

OTHER PUBLICATIONS

Dong et al., "Image Super-Resolution Using Deep Convolutional Networks", IEEE, arXiv:1501.00092v3 [cs.CV] Jul. 31, 2015; pp. 1-14.

(Continued)

*Primary Examiner* — Ruiping Li
(74) *Attorney, Agent, or Firm* — Procopio, Cory, Hargreaves & Savitch LLP (57) ABSTRACT

Frame handling an input image in an ML-based upscaling process to produce an output image, including: detecting and extracting boxing edge regions from edges of an active picture area of the input image; extending the extracted boxing edge regions by adding extra pixels around each of the boxing edge regions to produce padded edge regions; upscaling the padded edge regions to produce upscaled padded edge regions; cropping each of the upscaled padded edge regions to a size corresponding to the size of each of the boxing edge regions prior to the upscaling multiplied by an upscaling factor; inserting the cropped edge regions into the edges of the output image; and upscaling a non-edge region of the input image and inserting the upscaled non-edge region into the output image.

20 Claims, 7 Drawing Sheets

(51) Int. Cl.
*G06T 3/40* (2006.01)
*G06N 3/02* (2006.01)
*G06T 7/11* (2017.01)
*G06N 20/00* (2019.01)
*G06K 9/62* (2006.01)
*G06T 9/00* (2006.01)
*G06T 7/13* (2017.01)
*G06T 5/00* (2006.01)
*G06T 5/10* (2006.01)

(52) U.S. Cl.
CPC ............... *G06N 3/02* (2013.01); *G06N 20/00* (2019.01); *G06T 3/4046* (2013.01); *G06T 3/4053* (2013.01); *G06T 3/4076* (2013.01); *G06T 5/003* (2013.01); *G06T 5/10* (2013.01); *G06T 7/11* (2017.01); *G06T 7/13* (2017.01); *G06T 9/002* (2013.01); *G06T 2207/10024* (2013.01); *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 9,865,037 | B2 | 1/2018 | Salvador Marcos |
| 10,032,256 | B1 | 7/2018 | Anaya |
| 10,091,479 | B2 | 10/2018 | Barron et al. |
| 2004/0218834 | A1 | 11/2004 | Bishop |
| 2014/0267283 | A1 | 9/2014 | Nystad et al. |
| 2015/0117762 | A1 | 4/2015 | Shibata |
| 2017/0132759 | A1 | 5/2017 | Perez Pellitero |
| 2017/0256033 | A1* | 9/2017 | Tuzel ................. G06K 9/00255 |
| 2018/0158177 | A1 | 6/2018 | Lannes |
| 2019/0045168 | A1 | 2/2019 | Chaudhuri |
| 2020/0051211 | A1* | 2/2020 | Shiokawa ............. G06T 3/4053 |
| 2020/0126183 | A1 | 4/2020 | Zhu |

OTHER PUBLICATIONS

Shcherbinin et al., "Sharpening Image Details Using Local Phase Congruency Analysis", Society for Imaging Science and Technology, https://doi.org/10.2352/ISSN.2470-1173.2018.13.IPAS-218; pp. 218-1-218-5.

Uchida et al., "Non-blind image restoration based on convolutional neural network." In 2018 IEEE 7th Global Conference on Consumer Electronics (GCCE), pp. 40-44. Oct. 9-12, 2018. Nara, Japan. (Year: 2018).

Wikipedia, Luma (Video), published on Dec. 13, 2017 (Year: 2017).
Wikipedia, YCbCr, published on Oct. 3, 2017 (Year: 2017).

* cited by examiner

FRAME HANDLING FOR ML-BASED UPSCALING

CROSS-REFERENCE TO RELATED APPLICATIONS

This application claims the benefit of priority under 35 U.S.C. § 119(e) of U.S. Provisional Patent Application No. 62/747,453, filed Oct. 18, 2018, entitled "Machine-Learning Based Single Image Upscaling Application for Motion Pictures." The disclosure of the above-referenced application is incorporated herein by reference.

BACKGROUND

Field

The present disclosure relates to frame handling, and more specifically, to frame handling for machine learning-based (ML-based) upscaling.

Background

Machine learning (ML) can be used to perform image super-resolution upscaling. However, the conventional ML-based upscaling process has some observed issues when an image contains boxing edges (e.g., letterbox, pillarbox, window box) inserted during post processing. Accordingly, when the image with such a boxing edge is processed through the conventional ML-based upscaling, the upscaling may produce artifacts along the edges of the image, which may lead to the loss of clear and/or sharp edges in the final output.

SUMMARY

The present disclosure provides for processing the frame edges in the input prior to the ML-based training process.

In one implementation, a method for frame handling of an input image in an ML-based upscaling process to produce an output image is disclosed. The method includes: detecting and extracting boxing edge regions from edges of an active picture area of the input image; extending the extracted boxing edge regions by adding extra pixels around each of the boxing edge regions to produce padded edge regions; upscaling the padded edge regions to produce upscaled padded edge regions; cropping each of the upscaled padded edge regions to a size corresponding to the size of each of the boxing edge regions prior to the upscaling multiplied by an upscaling factor; inserting the cropped edge regions into the edges of the output image; and upscaling a non-edge region of the input image and inserting the upscaled non-edge region into the output image.

In one implementation, adding extra pixels around each of the boxing edge regions includes: determining how to pad the extra pixels around each of the boxing edge regions; and adding sub-regions of the extra pixels around each of the boxing edge regions. In one implementation, adding sub-regions includes determining a type for each of the sub-regions. In one implementation, a first type of the sub-regions includes the sub-regions with pixels that are entirely within the active picture area. In one implementation, the method further includes extending each of the boxing edge regions into directions of the sub-regions when the sub-regions are determined to be of the first type. In one implementation, a second type of the sub-regions comprises the sub-regions with at least one pixel that is not within the active picture area but is on an edge of one of the padded edge regions. In one implementation, the method further includes extending the boxing edge region using a butterfly image over the edges when the sub-regions are determined to be of the second type. In one implementation, a third type of the sub-regions includes the sub-regions with at least one pixel that is not within the active picture area but is on a corner of one of the padded edge regions. In one implementation, the method further includes extending each of the boxing edge regions using a butterfly image over the corners when the sub-regions are determined to be of the third type.

In another implementation, a system for frame handling of an input image in an ML-based upscaling process to produce an output image is disclosed. The system includes: an edge region extractor configured to detect and extract boxing edge regions from edges of an active picture area of the input image; an edge region extender configured to extend each of the boxing edge regions by adding extra pixels around each boxing edge region to produce padded edge regions, wherein the edge region extender feeds the padded edge regions to an upscaling processor to upscale and produce upscaled padded edge regions; an edge region cropper configured to crop each of the upscaled padded edge regions to a size corresponding to the size of each of the boxing edge region prior to the upscaling multiplied by an upscaling factor; an edge region filler configured to insert the cropped edge regions into the edges of the output image; and a non-edge region filler configured to upscale a non-edge region of the input image and insert the upscaled non-edge region into the output image.

In one implementation, the edge region extender adds the extra pixels around each of the boxing edge regions by adding sub-regions of the extra pixels around each of the boxing edge regions. In one implementation, adding sub-regions includes determining a type for each of the sub-regions. In one implementation, a first type of the sub-regions includes the sub-regions with pixels that are entirely within the active picture area. In one implementation, the edge region extender is configured to extend each of the boxing edge regions into directions of the sub-regions when the sub-regions are determined to be of the first type. In one implementation, a second type of the sub-regions includes the sub-regions with at least one pixel that is not within the active picture area but is on an edge of one of the padded edge regions. In one implementation, the edge region extender is configured to extend each of the boxing edge regions using a butterfly image over the edges when the sub-regions are determined to be of the second type. In one implementation, a third type of the sub-regions includes the sub-regions with at least one pixel that is not within the active picture area but is on a corner of one of the padded edge regions. In one implementation, the edge region extender is configured to extend each of the boxing edge regions using a butterfly image over the corners when the sub-regions are determined to be the third type.

In yet another implementation, a non-transitory computer-readable storage medium storing a computer program to frame handle an input image in an ML-based upscaling process to produce an output image is disclosed. The computer program includes executable instructions that cause a computer to: detect and extract boxing edge regions from edges of an active picture area of the input image; extend the extracted boxing edge regions by adding extra pixels around each of the boxing edge regions to produce padded edge regions; upscale the padded edge regions to produce upscaled padded edge regions; crop each of the upscaled padded edge regions to a size corresponding to the size of each of the boxing edge regions prior to the upscaling multiplied by an upscaling factor; insert the cropped edge regions into the edges of the output image; and upscale a non-edge region of the input image and inserting the upscaled non-edge region into the output image.

In one implementation, the executable instructions that cause a computer to extend the extracted boxing edge region include executable instructions that cause a computer to: determine how to pad the extra pixels around each of the boxing edge regions; and add sub-regions of the extra pixels.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1A:
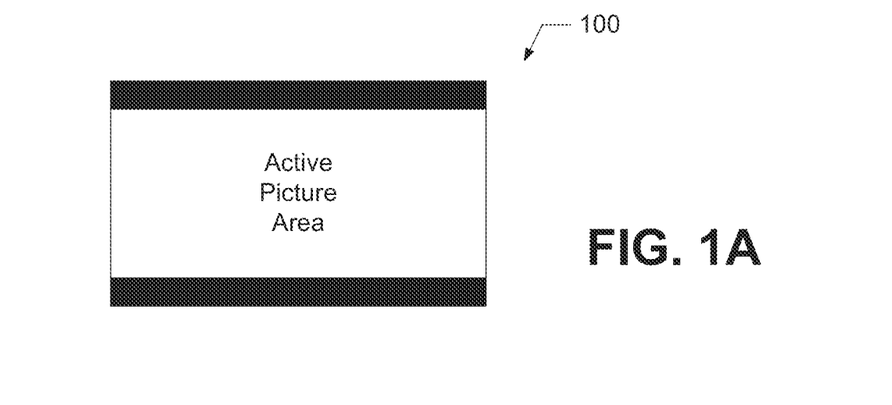
FIG. 1A shows a letterbox edge.
Figure 1B:
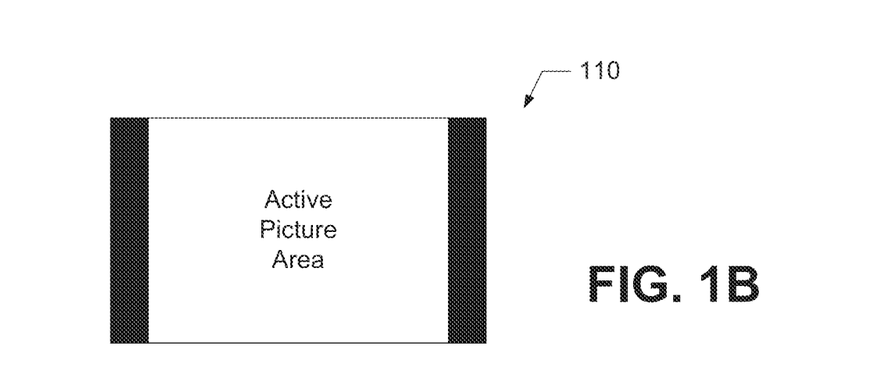
FIG. 1B shows a pillarbox edge.
Figure 1C:
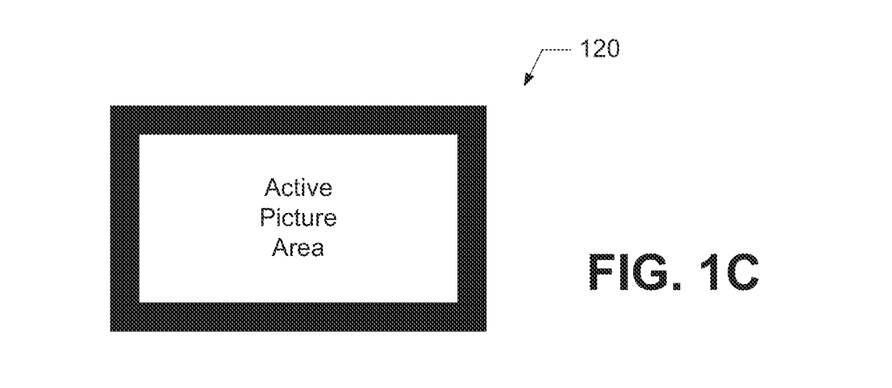
FIG. 1C shows a window box edge.

As described above, the conventional ML-based upscaling process has some observed issues when an image contains boxing edges inserted during post processing. For example, when the image with such boxing edges is processed through the conventional ML-based upscaling, the upscaling process may produce artifacts along the edges of the image, which may lead to the loss of clear and/or sharp edges in the final output. FIG. 1A, FIG. 1B, and FIG. 1C show examples of the boxing edges. FIG. 1A shows a letterbox edge 100; FIG. 1B shows a pillarbox edge 110; and FIG. 1C shows a window box edge 120.

To address the above-stated issues with the conventional process, certain implementations of the present disclosure provide for processing the frame edges in the input prior to the ML-based training process.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 2:
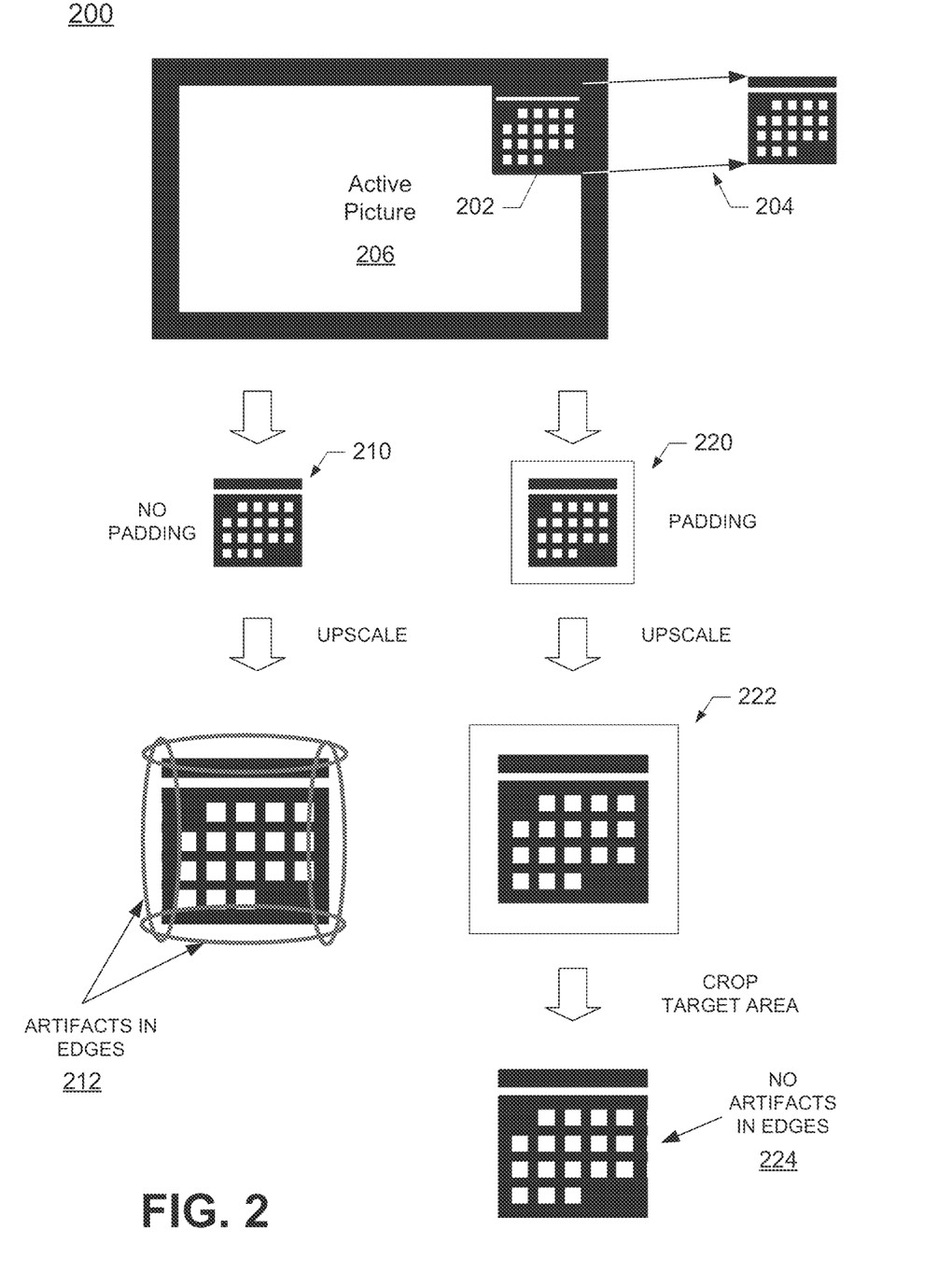
FIG. 2 is a flow diagram illustrating a process for frame handling in an ML-based upscaling process in accordance with one implementation of the present disclosure.

FIG. 2 is a flow diagram illustrating a process 200 for frame handling in an ML-based upscaling process in accordance with one implementation of the present disclosure. In the illustrated implementation of FIG. 2, the frame handling process 200 includes processing the edges of an input image to substantially reduce artifacts along the edges of the image when the image is processed through an ML-based upscaling process. FIG. 2 also shows the comparison of the frame handling process to the conventional ML-based upscaling process.

In the conventional ML-based upscaling process shown on the left side, no extra padding pixels are added around the boxing edge region 210. Thus, when the image is processed through the ML-based upscaling process, the upscaling process produces artifacts 212 along the edges of the image, which may lead to the loss of clear and/or sharp edges in the final output. In contrast, the process shown on the right side of FIG. 2 includes the frame handling process performed prior to ML-based upscaling.

In the illustrated implementation of FIG. 2, prior to the ML-based upscaling process, the boxing edge region 202 is detected and extracted 204 from the active picture area 206 of the input image. In one implementation of the frame handling process, the extracted boxing edge region 202 is then extended by adding extra padding/pixels around that region to produce a padded edge region 220. The details of how the extra padding/pixels are added are shown in FIG. 3.

In the illustrated implementation of FIG. 2, the padded edge region 220 is fed into an ML-based upscaling processor (e.g., a neural network) to produce the upscaled padded edge region 222. In one implementation, the upscaled padded edge region 222 is cropped to a size corresponding to the size of the original region 202 prior to the upscaling process multiplied by the upscaling factor. Thus, the cropping produces a clean edge region 224 with no artifacts on the edges. The cropped and cleaned edge region 224 is then inserted into the output image as the output upscaled image.

In one implementation, the steps of: (1) detecting and extracting a boxing edge region from the active picture area of the input image; (2) padding the boxing edge region; (3) upscaling the padded boxing edge region; (4) cropping the upscaled boxing edge region to the size of the original region; and (5) inserting the cropped boxing edge region into the output image; are repeated for all of the edges of the active picture area of the input image. Further, the remaining non-edge region is extracted, upscaled, and inserted into the output image to complete the upscaled output image.

Figure 3:
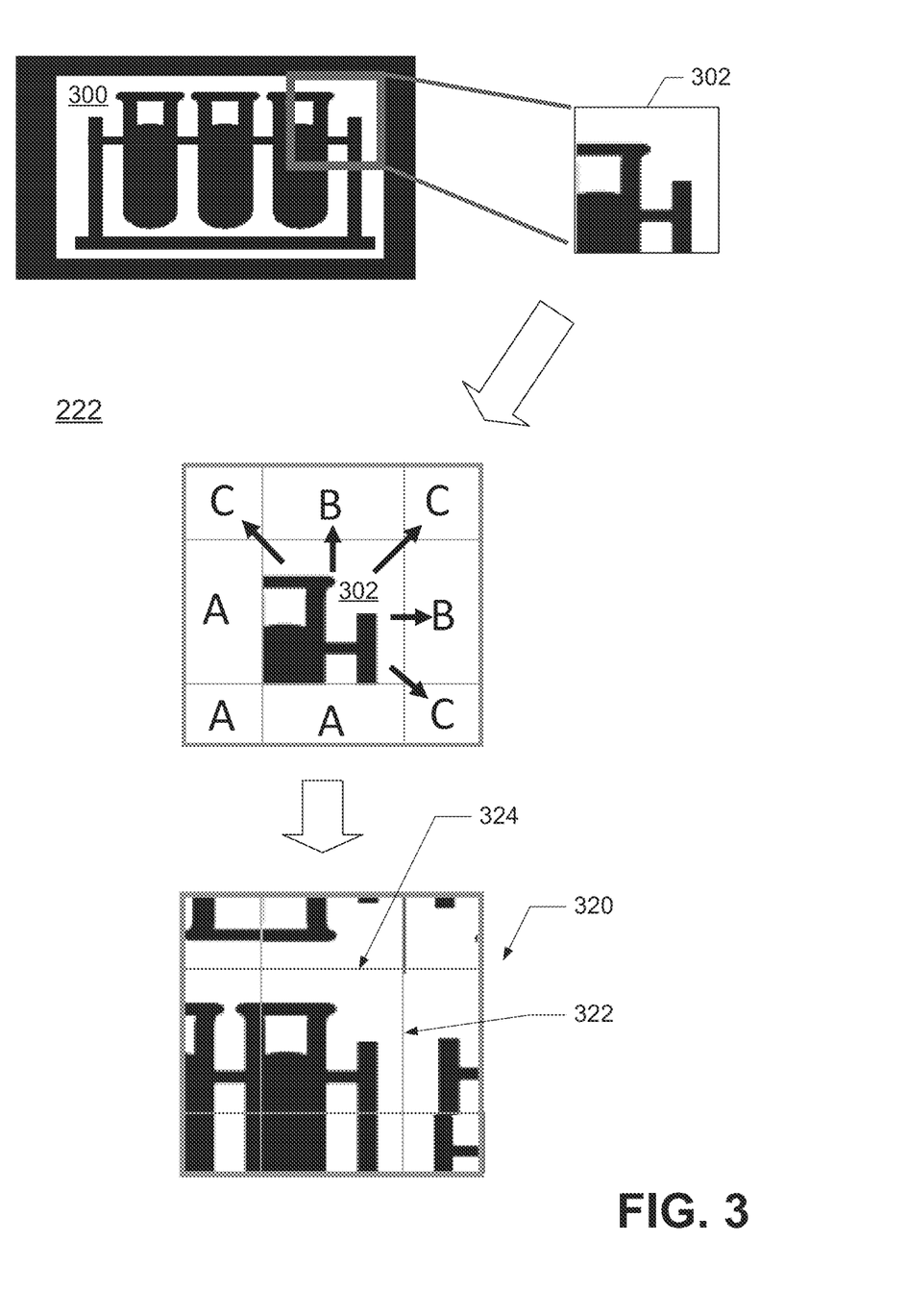
FIG. 3 is a detailed flow diagram illustrating a padding process of the frame handling process shown in FIG. 2 in accordance with one implementation of the present disclosure.

FIG. 3 is a detailed flow diagram illustrating a padding process 222 of the frame handling process shown in FIG. 2 in accordance with one implementation of the present disclosure. The illustrated implementation of FIG. 3 shows the extracted boxing edge region 302 being padded with additional padding/pixel regions (B and C regions) to produce the padded region 320.

In one implementation, the additional padding/pixel regions to be added to the extracted boxing edge region 302 include eight sub-regions (e.g., two sides, top and bottom, and four corners). In this implementation, the eight sub-regions are classified into 3 types of pad designs (e.g., A, B, C).

In one example, the type A pad design is used for sub-regions that are within the active picture area 300. Thus, the type A pad design is formed by extending the image area to the four directions. In FIG. 3, the type A pad design is used for the left sub-region, the bottom sub-region, and the bottom left corner sub-region. Accordingly, the padded region 320 shows those sub-regions (i.e., the left sub-region, the bottom sub-region, and the bottom left corner sub-region) being formed by extending the image area to the four directions.

In another example, the type B pad design is used for sub-regions that are not within the active picture area 300 but are in an edge (e.g., left, right, top, or bottom). Thus, the type B pad design is formed using a butterfly image over the edge. In one implementation, the butterfly image refers to an image that is a mirror image at the line (e.g. line 322 or line 324) between the extracted boxing edge region 302 and the type B pad region.

In FIG. 3, type B pad design is used for the top sub-region and the right sub-region, which are not in the active picture area 300 and are not in any of the corners. Accordingly, the padded region 320 shows those sub-regions (i.e., the top sub-region and the right sub-region) being formed using the butterfly image over the edge.

In another example, the type C pad design is used for sub-regions that are not within the active picture area 300 but are in a corner (e.g., top left corner, top right corner, bottom left corner, or bottom right corner). Thus, the type C pad design is formed using a butterfly image over the corner point. In FIG. 3, type C pad design is used for the top left corner sub-region, the top right corner sub-region, and the bottom right corner sub-region, which are not in the active picture area 300 and are in the corners. Accordingly, the padded region 320 shows those sub-regions (i.e., the top left corner sub-region, the top right corner sub-region, and the bottom right corner sub-region) being formed using the butterfly image over the corner point.

Figure 4:
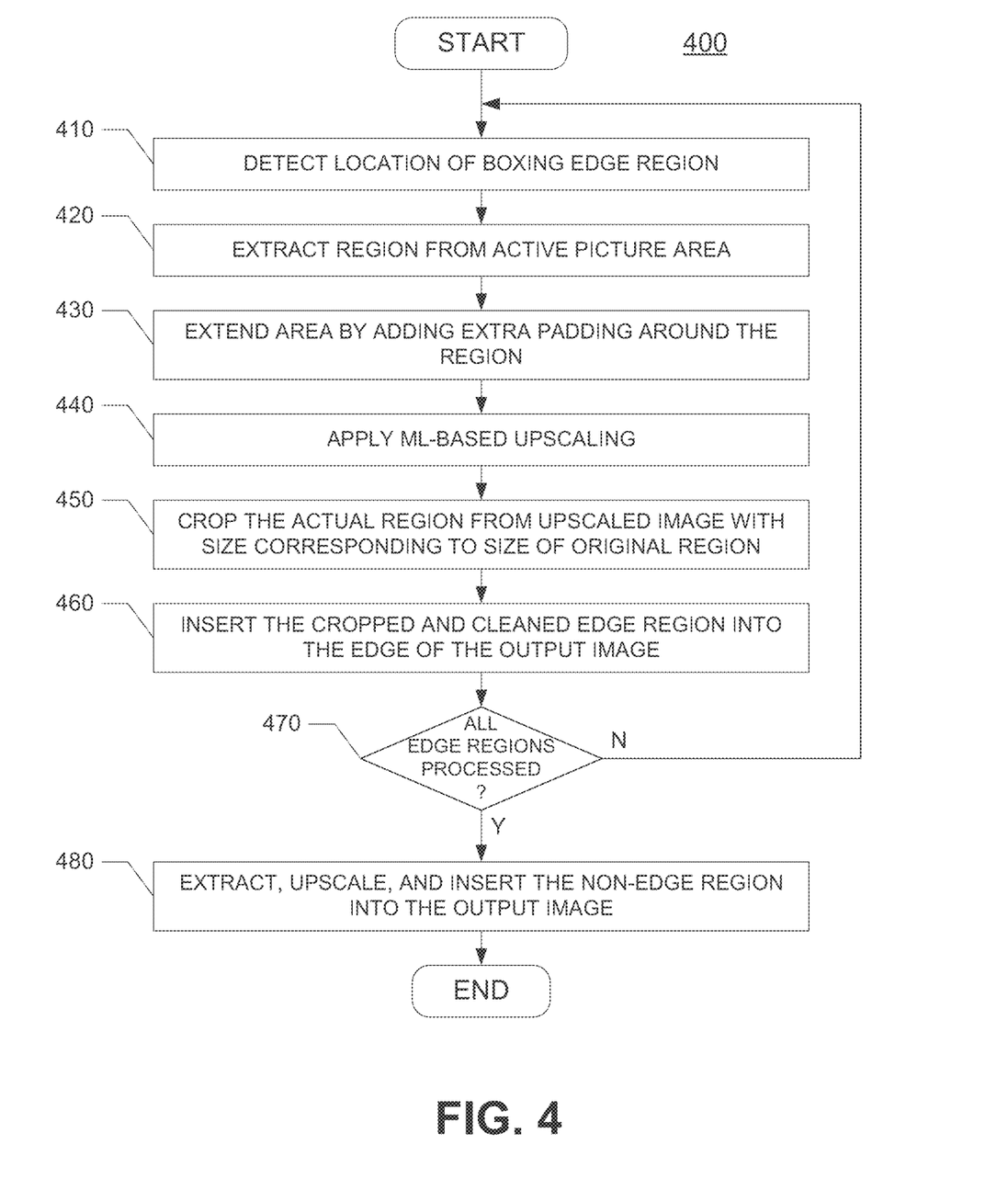
FIG. 4 is a flow chart illustrating a process for frame handling in an ML-based upscaling process in accordance with one implementation of the present disclosure.

FIG. 4 is a flow chart illustrating a process 400 for frame handling in an ML-based upscaling process in accordance with one implementation of the present disclosure. In the illustrated implementation of FIG. 4, the frame handling process 400 includes detecting, at block 410, a location of the boxing edge region within the active picture area of an input image. The detected boxing edge region is extracted from the active picture area, at block 420. The extracted boxing edge region is then extended, at block 430, by adding extra padding/pixels around that region to produce a padded edge region. The details of how the extra padding/pixels are added are shown in the flow chart shown in FIG. 5.

In the illustrated implementation of FIG. 4, the padded edge region is fed into an ML-based upscaling processor (e.g., a neural network), at block 440, to produce an upscaled padded edge region. The upscaled padded edge region is cropped, at block 450, to a size corresponding to the size of the original region prior to the upscaling process multiplied by the upscaling factor. Thus, the cropping produces a clean edge region with no artifacts on the edges. The cropped and cleaned edge region is then inserted into the edge of the output image as the output upscaled image, at block 460.

In one implementation, a determination is made, at block 470, whether all edge regions of the input image have been processed. If it is determined, at block 470, that not all of the edge regions have been processed, steps 410 through 460 are repeated for the next edge region. Otherwise, if it is determined, at block 470, that all edge regions have been processed, the process 400 continues by extracting, upscaling, and inserting the non-edge region into the output image, at block 480.

Figure 5:
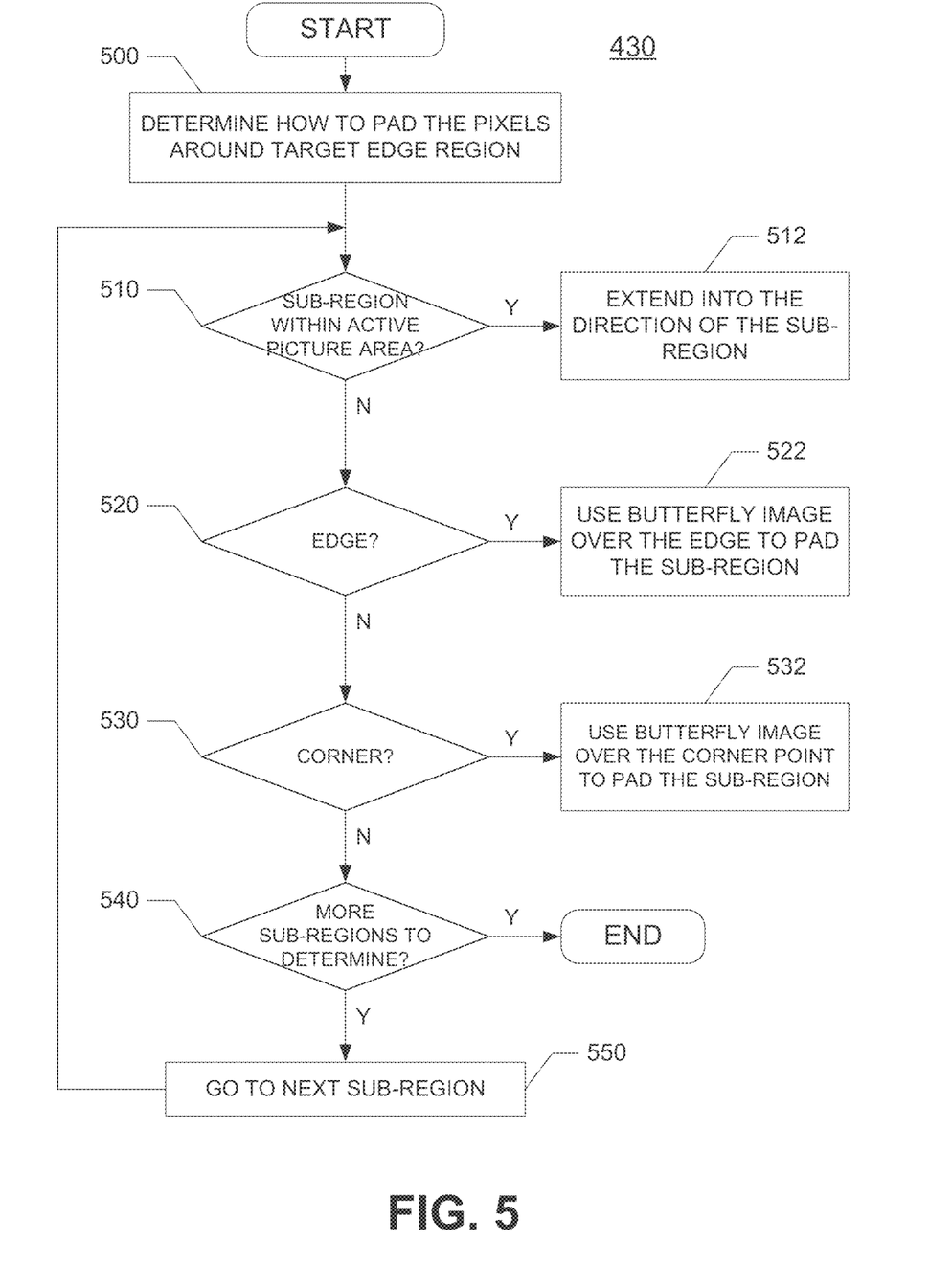
FIG. 5 is a detailed flow chart illustrating a padding process of the frame handling process shown in FIG. 4 in accordance with one implementation of the present disclosure.

FIG. 5 is a detailed flow chart illustrating a padding process 430 of the frame handling process shown in FIG. 4 in accordance with one implementation of the present disclosure. In the illustrated implementation of FIG. 5, a determination is initially made, at block 500, as to how to pad the pixels around the target edge region. In one implementation, the pixels to be padded around the target edge region (i.e., the boxing edge region 302 shown in FIG. 3) are grouped into a plurality of sub-regions.

In the illustrated implementation of FIG. 5, the pixels to be padded are grouped into three sub-regions. Each sub-region to be padded around the target edge region is checked, at block 510, to determine whether it is a first type (e.g., Type A in FIG. 3), wherein the sub-region is within the active picture area (e.g., 300 in FIG. 3). The image area is then extended into the direction of the sub-region, at block 512, if the sub-region is within the active picture area.

Otherwise, if the sub-region is determined, at block 520, to be outside of the active picture area, but is in an edge (e.g., Type B in FIG. 3), the image area is padded using a butterfly image over the edge, at block 522. As indicated above, the type B pad design is used for the top sub-region and the right sub-region, which are not in the active picture area and are not in any of the corners.

Otherwise, if the sub-region is determined, at block 530, to be outside of the active picture area, but is in a corner (e.g., Type C in FIG. 3), the image area is padded using a butterfly image over the corner point, at block 532. As indicated above, the type C pad design is used for the top left corner sub-region, the top right corner sub-region, and the bottom right corner sub-region, which are not in the active picture area and are in the corners.

If it is determined, at block 540, that there are more sub-regions to process, then the process moves to the next sub-region, at block 550, and reverts back to block 510. Otherwise, the process terminates.

Although blocks 510, 520, 530 of process 500 in FIG. 5 are laid out in a particular order, the blocks can be performed in any order without affecting the outcome of the process 500.

Figure 6:
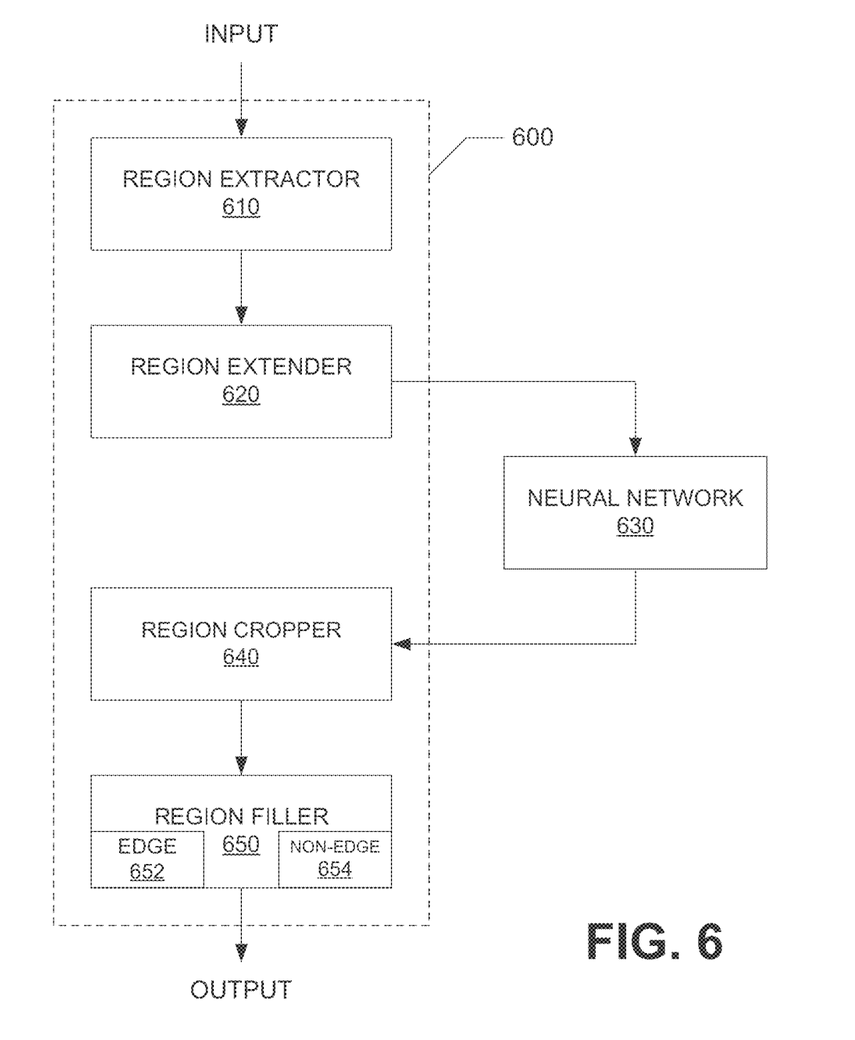
FIG. 6 is a block diagram showing a frame handling system in accordance with one implementation of the present disclosure.

FIG. 6 is a block diagram showing a frame handling system 600 in accordance with one implementation of the present disclosure. In the illustrated implementation of FIG. 6, the frame handling system 600 includes a boxing edge region extractor 610, an edge region extender 620, an edge region cropper 640, and a region filler 650 including an edge region filler 652 and a non-edge region filler 654.

In the illustrated implementation of FIG. 6, the edge region extractor 610 is configured to detect the location of the boxing edge regions within the active picture area of an input image and extract the edge regions from the active picture area. The edge region extender 620 is configured to extend each of the edge regions by adding extra padding/pixels around each region to produce padded edge regions. As stated above, the details of how the extra padding/pixels are added are shown in the flow chart shown in FIG. 5.

In the illustrated implementation of FIG. 6, the padded edge regions are fed into an ML-based upscaling processor (e.g., a neural network 630) to produce upscaled padded edge regions. The edge region cropper 640 is configured to crop each of the upscaled padded edge regions to a size corresponding to the size of the original region prior to the upscaling process multiplied by the upscaling factor. Thus, the cropping produces clean edge regions with no artifacts on the edges. The edge region filler 652 is configured to insert the cropped and cleaned edge regions into the edges of the output image. Further, the non-edge region filler 654 is configured to upscale the non-edge region and insert the upscaled non-edge region into the output image to complete the upscaled output image.

In one implementation, the frame handling system 600 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the frame handling system 600 is configured with a combination of hardware and software.

Figure 7A:
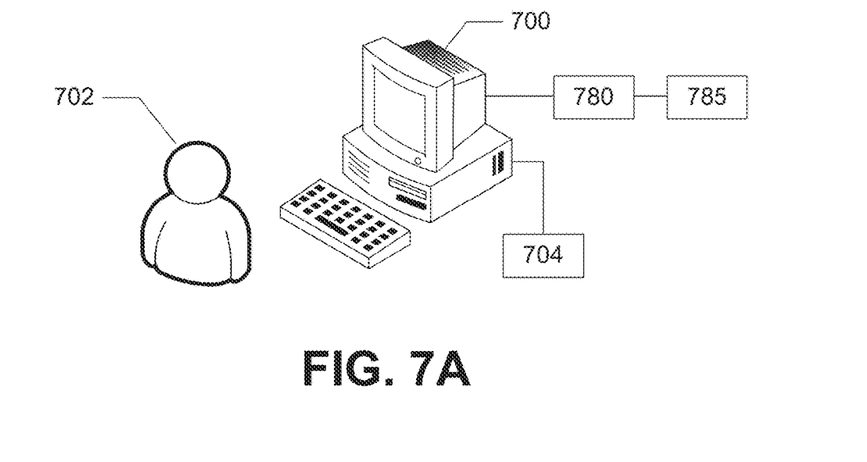
FIG. 7A is a representation of a computer system and a user in accordance with an implementation of the present disclosure.

FIG. 7A is a representation of a computer system 700 and a user 702 in accordance with an implementation of the present disclosure. The user 702 uses the computer system 700 to implement an application for frame handling in an upscaling process.

Figure 7B:
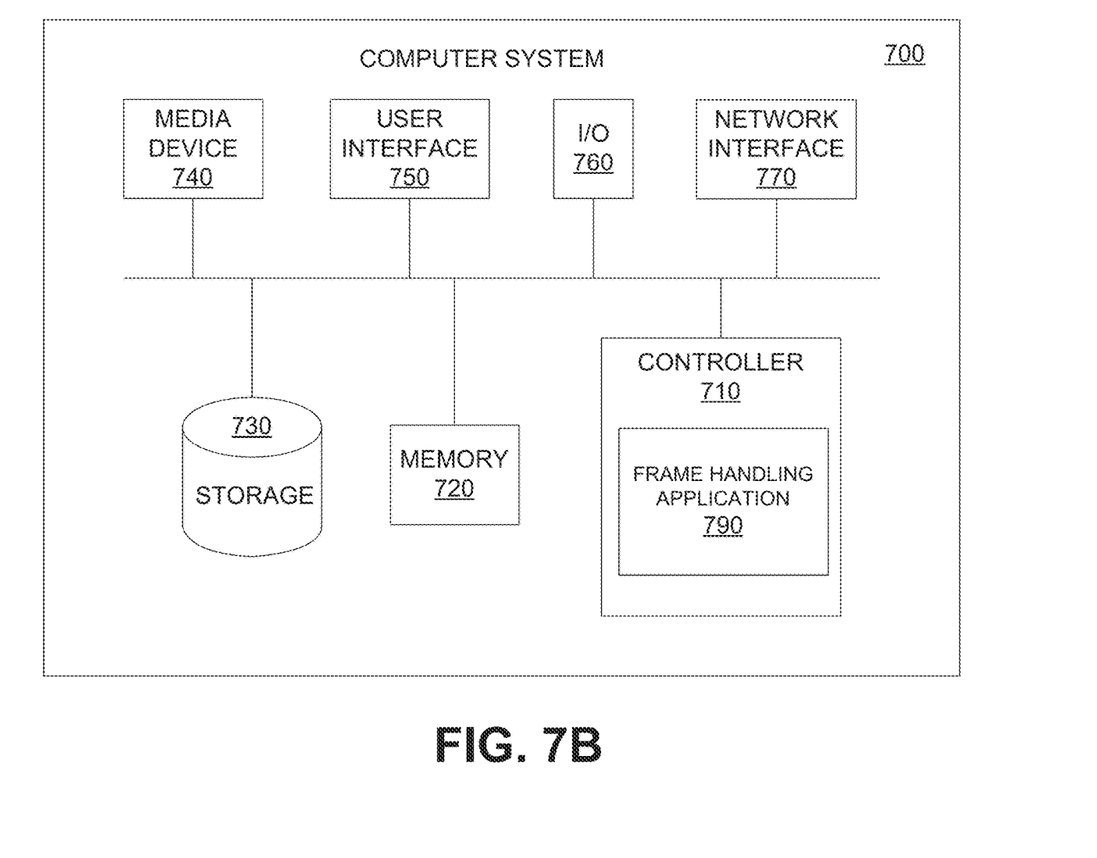
FIG. 7B is a functional block diagram illustrating the computer system hosting the frame handling application in accordance with an implementation of the present disclosure.

The computer system 700 stores and executes the frame handling application 790 of FIG. 7B. In addition, the computer system 700 may be in communication with a software program 704. Software program 704 may include the software code for the enhanced color reproduction application. Software program 704 may be loaded on an external medium such as a CD, DVD, or a storage drive, as will be explained further below.

Furthermore, computer system 700 may be connected to a network 780. The network 780 can be connected in various different architectures, for example, client-server architecture, a Peer-to-Peer network architecture, or other type of architectures. For example, network 780 can be in communication with a server 785 that coordinates engines and data used within the enhanced color reproduction application. Also, the network can be different types of networks. For example, the network 780 can be the Internet, a Local Area Network or any variations of Local Area Network, a Wide Area Network, a Metropolitan Area Network, an Intranet or Extranet, or a wireless network.

FIG. 7B is a functional block diagram illustrating the computer system 700 hosting the frame handling application 790 in accordance with an implementation of the present disclosure. A controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the frame handling application 790 with a software system, such as to enable the creation and configuration of engines and data extractors within the enhanced color reproduction application. Alternatively, this service can be implemented as separate hardware components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data either temporarily or for long periods of time for use by the other components of computer system 700. For example, storage 730 stores data used by the frame handling application 790. In one implementation, storage 730 is a hard disk drive.

The media device 740 receives removable media and reads and/or writes data to the inserted media. In one implementation, for example, the media device 740 is an optical disc drive.

The user interface 750 includes components for accepting user input from the user of the computer system 700 and presenting information to the user 702. In one implementation, the user interface 750 includes a keyboard, a mouse, audio speakers, and a display. The controller 710 uses input from the user 702 to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).]

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for frame handling of an input image in an ML-based upscaling process to produce an output image, the method comprising:
   detecting and extracting boxing edge regions from edges of an active picture area of the input image;
   extending the extracted boxing edge regions by adding extra pixels around each region of the boxing edge regions, and pixels in each region forming a design,
   wherein the added extra pixels form padded edge regions around each region,
   wherein the added extra pixels in the active picture area are generated by extending each region into the active picture area, and
   wherein the added extra pixels outside the active picture area are generated by transforming the pixels of the design in each region;
   upscaling the padded edge regions to produce upscaled padded edge regions;
   cropping each of the upscaled padded edge regions to a size corresponding to the size of each of the boxing edge regions prior to the upscaling multiplied by an upscaling factor;
   inserting the cropped edge regions into the edges of the output image; and
   upscaling a non-edge region of the input image and inserting the upscaled non-edge region into the output image.

2. The method of claim 1, wherein adding extra pixels around each of the boxing edge regions comprises:
   determining how to pad the extra pixels around each of the boxing edge regions; and
   adding sub-regions of the extra pixels around each of the boxing edge regions.

3. The method of claim 2, wherein adding sub-regions comprises determining a type for each of the sub-regions.

4. The method of claim 3, wherein a first type of the sub-regions comprises
   the sub-regions with pixels that are entirely within the active picture area.

5. The method of claim 4, further comprising
   extending each of the boxing edge regions into directions of the sub-regions when the sub-regions are determined to be of the first type.

6. The method of claim 3, wherein a second type of the sub-regions comprises
   the sub-regions with at least one pixel that is not within the active picture area but is on an edge of one of the padded edge regions.

7. The method of claim 6, further comprising
   extending the boxing edge region using a butterfly image over the edges when the sub-regions are determined to be of the second type.

8. The method of claim 3, wherein a third type of the sub-regions comprises
   the sub-regions with at least one pixel that is not within the active picture area but is on a corner of one of the padded edge regions.

9. The method of claim 8, further comprising
   extending each of the boxing edge regions using a butterfly image over the corners when the sub-regions are determined to be of the third type.

10. A system for frame handling of an input image in an ML-based upscaling process to produce an output image, the system comprising:
    an edge region extractor configured to detect and extract boxing edge regions from edges of an active picture area of the input image;
    an edge region extender configured to extend each region of the boxing edge regions by adding extra pixels around each boxing edge region, and pixels in each region forming a design,
    wherein the added extra pixels form padded edge regions around each region,
    wherein the added extra pixels in the active picture area are generated by extending each region into the active picture area, and
    wherein the added extra pixels outside the active picture area are generated by transforming the pixels of the design in each region,
    wherein the edge region extender feeds the padded edge regions to an upscaling processor to upscale and produce upscaled padded edge regions;
    an edge region cropper configured to crop each of the upscaled padded edge regions to a size corresponding to the size of each of the boxing edge region prior to the upscaling multiplied by an upscaling factor;
    an edge region filler configured to insert the cropped edge regions into the edges of the output image; and
    a non-edge region filler configured to upscale a non-edge region of the input image and insert the upscaled non-edge region into the output image.

11. The system of claim 10, wherein the edge region extender adds the extra pixels around each of the boxing edge regions by adding sub-regions of the extra pixels around each of the boxing edge regions.

12. The system of claim 11, wherein adding sub-regions comprises determining a type for each of the sub-regions.

13. The system of claim 12, wherein a first type of the sub-regions comprises
    the sub-regions with pixels that are entirely within the active picture area.

14. The system of claim 13, wherein the edge region extender is further configured to extend each of the boxing edge regions into directions of the sub-regions when the sub-regions are determined to be of the first type.

15. The system of claim 12, wherein a second type of the sub-regions comprises
    the sub-regions with at least one pixel that is not within the active picture area but is on an edge of one of the padded edge regions.

16. The system of claim 15, wherein the edge region extender is further configured to extend each of the boxing edge regions using a butterfly image over the edges when the sub-regions are determined to be of the second type.

17. The system of claim 12, wherein a third type of the sub-regions comprises
the sub-regions with at least one pixel that is not within the active picture area but is on a corner of one of the padded edge regions.

18. The system of claim 17, wherein the edge region extender is configured to extend each of the boxing edge regions using a butterfly image over the corners when the sub-regions are determined to be the third type.

19. A non-transitory computer-readable storage medium storing a computer program to frame handle an input image in an ML-based upscaling process to produce an output image, the computer program comprising executable instructions that cause a computer to:
    detect and extract boxing edge regions from edges of an active picture area of the input image;
    extend the extracted boxing edge regions by adding extra pixels around each region of the boxing edge regions, and pixels in each region forming a design,
    wherein the added extra pixels form padded edge regions around each region,
    wherein the added extra pixels in the active picture area are generated by extending each region into the active picture area, and
    wherein the added extra pixels outside the active picture area are generated by transforming the pixels of the design in each region;
    upscale the padded edge regions to produce upscaled padded edge regions;
    crop each of the upscaled padded edge regions to a size corresponding to the size of each of the boxing edge regions prior to the upscaling multiplied by an upscaling factor;
    insert the cropped edge regions into the edges of the output image; and
    upscale a non-edge region of the input image and inserting the upscaled non-edge region into the output image.

20. The non-transitory computer-readable storage medium of claim 19, wherein the executable instructions that cause a computer to extend the extracted boxing edge regions comprise executable instructions that cause a computer to:
    determine how to pad the extra pixels around each of the boxing edge regions; and
    add sub-regions of the extra pixels.

* * * * *